(12) United States Patent
Sugita

(10) Patent No.: US 10,136,016 B2
(45) Date of Patent: Nov. 20, 2018

(54) COMMUNICATION APPARATUS HAVING PROHIBITED DATA DELETION, METHOD OF CONTROLLING THE SAME, AND STORAGE MEDIUM

(71) Applicant: CANON KABUSHIKI KAISHA, Tokyo (JP)

(72) Inventor: Hikaru Sugita, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/422,587

(22) Filed: Feb. 2, 2017

(65) Prior Publication Data
US 2017/0230525 A1    Aug. 10, 2017

(30) Foreign Application Priority Data

Feb. 8, 2016   (JP) .................................. 2016-022217

(51) Int. Cl.
| | |
|---|---|
| *H04N 1/00* | (2006.01) |
| *G06F 3/00* | (2006.01) |
| *H04N 1/21* | (2006.01) |
| *H04N 1/32* | (2006.01) |

(52) U.S. Cl.
CPC ....... *H04N 1/00925* (2013.01); *H04N 1/0044* (2013.01); *H04N 1/00464* (2013.01); *H04N 1/2191* (2013.01); *H04N 1/32502* (2013.01); *H04N 1/32625* (2013.01); *H04N 2201/0093* (2013.01); *H04N 2201/0094* (2013.01)

(58) Field of Classification Search
CPC ............. H04N 1/00925; H04N 1/0044; H04N 1/00464; H04N 1/32502; H04N 1/32625; H04N 1/2191; H04N 2201/0093; H04N 2201/0094
See application file for complete search history.

(56) References Cited

U.S. PATENT DOCUMENTS

| | | | | |
|---|---|---|---|---|
| 6,820,100 B2 * | 11/2004 | Funahashi | ........... | G06F 17/3028 |
| 8,880,998 B2 * | 11/2014 | Jerome | ................. | G06Q 40/00 |
| | | | | 707/602 |
| 2006/0003693 A1 * | 1/2006 | Onomatsu | ................ | H01Q 3/24 |
| | | | | 455/3.02 |

(Continued)

FOREIGN PATENT DOCUMENTS

JP    2012-238923    12/2012

*Primary Examiner* — Benny Q Tieu
*Assistant Examiner* — Juan M Guillermety
(74) *Attorney, Agent, or Firm* — Fitzpatrick, Cella, Harper & Scinto

(57) ABSTRACT

A communication apparatus capable of performing facsimile communication includes at least one memory that stores a set of instructions and at least one processor. The processor executes the instructions to receive facsimile data, store the received facsimile data in a storage, generate a preview image based on the stored facsimile data, and transmit, according to a request for a preview image from an external device, the generated preview image to the external device. In addition, the stored facsimile data is deleted according to an instruction, but deletion of the facsimile data in the storage is prohibited while the external device is displaying the preview image of the facsimile data if the instruction is received from another external device.

11 Claims, 9 Drawing Sheets

(56) References Cited

U.S. PATENT DOCUMENTS

| | | | |
|---|---|---|---|
| 2008/0127307 A1* | 5/2008 | Fukuta | H04N 1/44 726/3 |
| 2008/0310628 A1* | 12/2008 | Fujioka | H04L 9/0822 380/201 |
| 2009/0201316 A1* | 8/2009 | Bhatt | G06F 9/4443 345/660 |
| 2010/0053690 A1* | 3/2010 | Gotoh | H04N 1/6011 358/3.27 |
| 2012/0287453 A1 | 11/2012 | Usui | 358/1.13 |
| 2013/0057917 A1* | 3/2013 | Ohta | G06F 3/1273 358/1.15 |
| 2013/0179774 A1* | 7/2013 | Wang | G06F 17/3092 715/234 |
| 2014/0160509 A1* | 6/2014 | Kondo | H04N 1/00954 358/1.13 |
| 2014/0215568 A1* | 7/2014 | Kirigin | G06F 21/00 726/4 |
| 2015/0207957 A1* | 7/2015 | Lee | H04N 1/0044 358/452 |
| 2016/0072889 A1* | 3/2016 | Jung | H04L 67/1097 709/219 |
| 2016/0313896 A1* | 10/2016 | Liang | G06F 3/0486 |

* cited by examiner

FIG. 3

| RECEIVED JOB STATUS | | | | |
|---|---|---|---|---|
| | | | TO PORTAL — 304 | LOGOUT — 305 |
| RECEIPT NUMBER | TIME OF RECEIPT | RECEIVED FROM | STATUS | JOB TYPE | JOB OPERATION |
| 301 — 0001 | 00:00 | 0000 | PRINT READY | FAX | PRINT  DELETE |
| 0002 | 00:01 | 0001 | PRINT READY | FAX | PRINT  DELETE |
| 0003 | 00:02 | 0002 | PRINT READY | FAX | PRINT — 302  DELETE — 303 |
| 0004 | 00:03 | 0003 | RECEIVING | FAX | |

THE DESIGNATED JOB CANNOT BE DELETED DUE TO
THIS JOB CURRENTLY BEING PREVIEWED BY ANOTHER USER.
PLEASE TRY AGAIN IN A SHORT WHILE.

OK

THE MEMORY RECEPTION SETTING CANNOT BE CHANGED DUE TO
A JOB CURRENTLY BEING PREVIEWED BY ANOTHER USER.
PLEASE TRY AGAIN IN A SHORT WHILE.

OK

COMMUNICATION APPARATUS HAVING PROHIBITED DATA DELETION, METHOD OF CONTROLLING THE SAME, AND STORAGE MEDIUM

BACKGROUND OF THE INVENTION

Field of the Invention

The present invention relates to a communication apparatus, a method of controlling the same, and a storage medium.

Description of the Related Art

There are facsimile machines that have a memory reception function of saving received fax data in a storage device of the main unit without printing the fax data, and printing the fax data that has been stored, in response to a request from a user. With such facsimile machines, there is increasing demand, following an increase in the reception of faxes such as advertisements and the like from unspecified persons, to be able to easily check the contents of received fax data and judge whether to print the fax data or whether to delete the fax data without printing.

In view of this demand, it has been proposed to display the contents of fax data received with memory reception on the operation panel of the facsimile machine or on the web browser (remote UI (RUI)) of a client PC via a network. Furthermore, a configuration in which the user is able to print or delete fax data after checking the contents of the fax data on the RUI has been proposed. For example, Japanese Patent Laid-Open No. 2012-238923 discloses selecting a PC as the destination to which fax data stored with memory reception is to be output when the "memory reception function" setting is canceled, thus enabling fax data received with memory reception that the user has not checked to be checked on the PC, without being printed.

The RUI can be simultaneously accessed by a plurality of users, although when a plurality of users access the RUI at the same time, it is possible for a job that is being previewed by one user to be deleted by another user, and also for the "memory reception function" to be set/cancel. When a job being previewed by one user is deleted by another user, a situation thereby arises in which the user previewing the job is unable to print the job when he or she tries to print after viewing the preview display.

Furthermore, since the RUI and the operation panel (local UI (LUI)) of the image forming apparatus can be operated at the same time, the abovementioned situation could also possibly arise between the RUI and the LUI.

SUMMARY OF THE INVENTION

An aspect of the present invention is to eliminate the abovementioned problems with the conventional techniques.

A feature of the present invention is to provide a technique that prevents deletion of a job that is being previewed from affecting an operation performed on the job by another user.

According to a first aspect of the present invention, there is provided a communication apparatus being capable of performing facsimile communication, comprising: at least one memory that stores a set of instructions; and at least one processor that executes the instructions to: receive facsimile data; store the received facsimile data in a storage; generate a preview image, based on the facsimile data stored in the storage; transmit, in response to a request for a preview image from an external device, the preview image that was generated to the external device; and delete, based on an instruction to delete facsimile data stored in the storage, the facsimile data from the storage, wherein, in response to having received an instruction to display the preview image from the external device, facsimile data corresponding to the preview image is no longer able to be deleted from the storage.

According to a second aspect of the present invention, there is provided a method of controlling a communication apparatus being capable of performing facsimile communication, the method comprising: receiving facsimile data; storing the received facsimile data in a storage; generating a preview image, based on the facsimile data stored in the storage; transmitting, in response to a request for a preview image from an external device, the preview image that was generated to the external device; and deleting, based on an instruction to delete facsimile data stored in the storage, the facsimile data from the storage, wherein, in response to having received an instruction to display the preview image from the external device, facsimile data corresponding to the preview image is no longer able to be deleted from the storage.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a diagram showing an exemplary display in which the job statuses of fax jobs received by the MFP are displayed on a PC according to the first embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Note that the embodiments will be described taking a multifunction peripheral (MFP) having print, scan and facsimile functions as an example of an image processing apparatus.

First Embodiment

A first embodiment of the present invention will be described.

Figure 1:
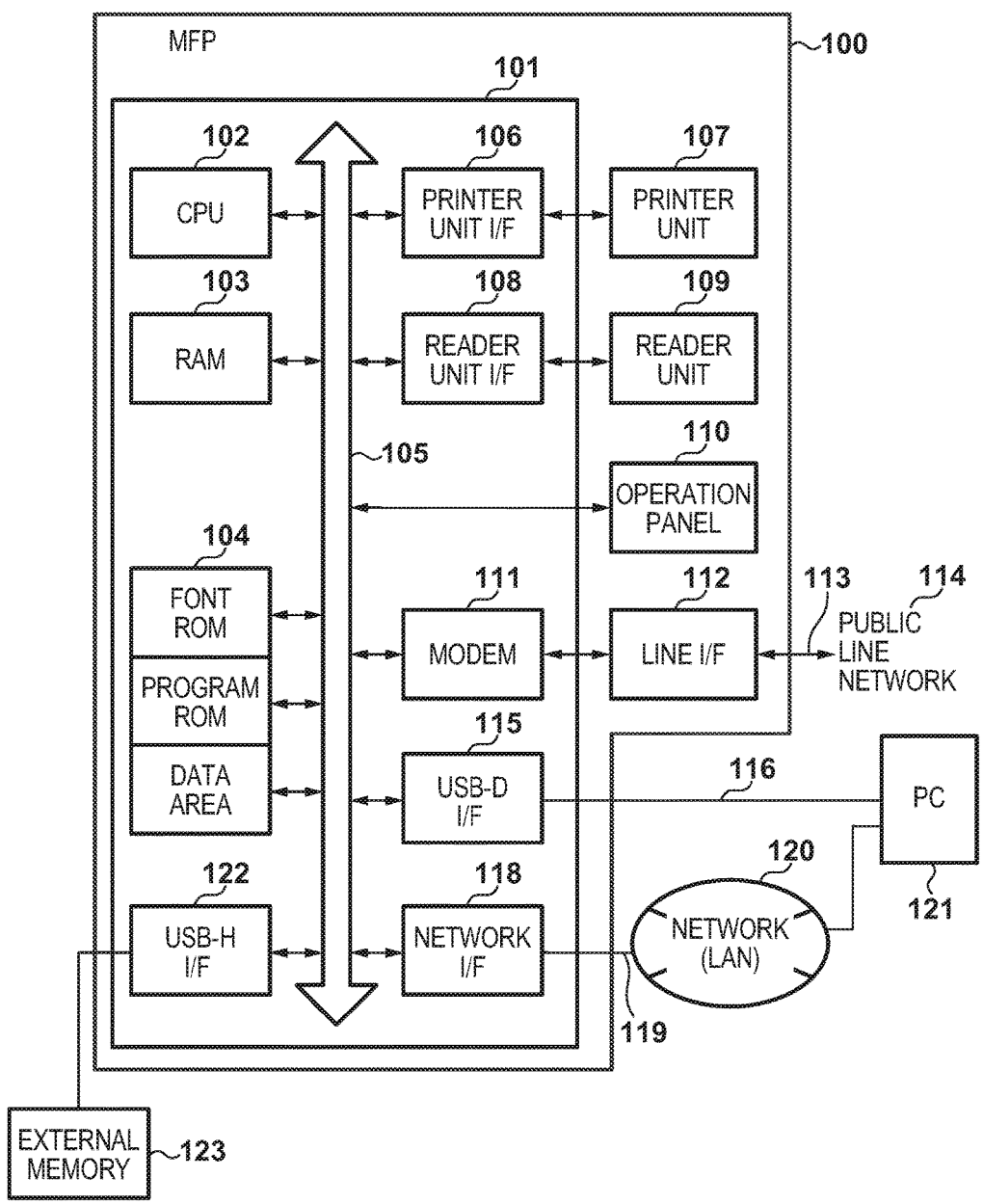
FIG. 1 is a block diagram for describing a hardware configuration of an MFP according to a first embodiment of the present invention.

FIG. 1 is a block diagram for describing a hardware configuration of an MFP 100 according to the first embodiment of the present invention. Each block shows a hardware module, and the arrows between the blocks show the flow of data or instructions.

The MFP 100 has a printer unit 107, a reader unit 109, an operation panel (operation unit) 110, a line I/F 112, and a controller unit 101 that administers control of these units. The controller unit 101 is provided with a CPU 102, a RAM 103, a non-volatile storage unit 104, a printer unit I/F 106, a reader unit I/F 108, a modem 111, a USB-D I/F 115, a network I/F 118, and a USB-H I/F 122. These units are connected via a system bus 105. Note that the non-volatile storage unit 104 is a non-volatile memory that is readable and writable, such as flash memory (registered trademark), for example. The CPU 102 performs overall control of the abovementioned units, in accordance with a control program stored in a program ROM of the non-volatile storage unit 104. This control program is executed by reading the control program stored in the program area of the non-volatile storage unit 104. Alternatively, compressed control program data stored in the program area of the non-volatile storage unit 104 may be deployed to the RAM 103 and executed. Alternatively, the aforementioned control program may be stored in a hard disk drive (HDD) (not shown) in a compressed state/non-compressed state, and may be deployed to the RAM 103 at the time of execution and executed. Here, I/F is an abbreviation for an interface.

The network I/F 118 performs communication processing with a PC 121 (PC) via a network (LAN) 120 or the like. The network I/F 118 and the network 120 are connected by a communication cable such as a LAN cable 119. Here, the PC 121 is able, using a web browser, to display jobs received by fax that are saved in the MFP 100 on a display unit (not shown) of the PC as a preview. Printing, deletion and the like of jobs received by fax that are saved in the MFP 100 can also be instructed from the PC 121. Also, the PC 121 may be connected with the USB-D I/F 115 via a USB cable 116. The modem 111 is connected to a public line network 114 via the line I/F 112 and a telephone line 113, and performs communication processing with other image forming apparatuses and facsimile machines, as well as telephones and the like that are not shown. The USB-H I/F 122 is directly connected to an external memory 123.

The printer unit I/F 106 acts as an interface that outputs image signals to the printer unit 107 (printer engine). Also, the reader unit I/F 108 acts as an interface that inputs read image signals from the reader unit 109 (scanner engine). The CPU 102 processes the image signals input from the reader unit I/F 108, and outputs the processed image signals to the printer unit I/F 106 as recording image signals. Also, the CPU 102 uses font information stored in a font area of the non-volatile storage unit 104 to display characters and symbols on the display unit of the operation panel 110, and receives instruction information from the operation panel 110 which has received instructions from the user. Also, device information on the MFP 100, telephone directory information of the user, department management information, fax transmission and reception data and the like are stored in the data area of the non-volatile storage unit 104 by the CPU 102, read out by the CPU 102 if needed, and updated if needed. Note that although a configuration in which the reader unit 109 and the printer unit 107 are provided internally to the MFP 100 is shown in FIG. 1, a configuration may be adopted in which one or both of these units are provided externally.

Figure 2:
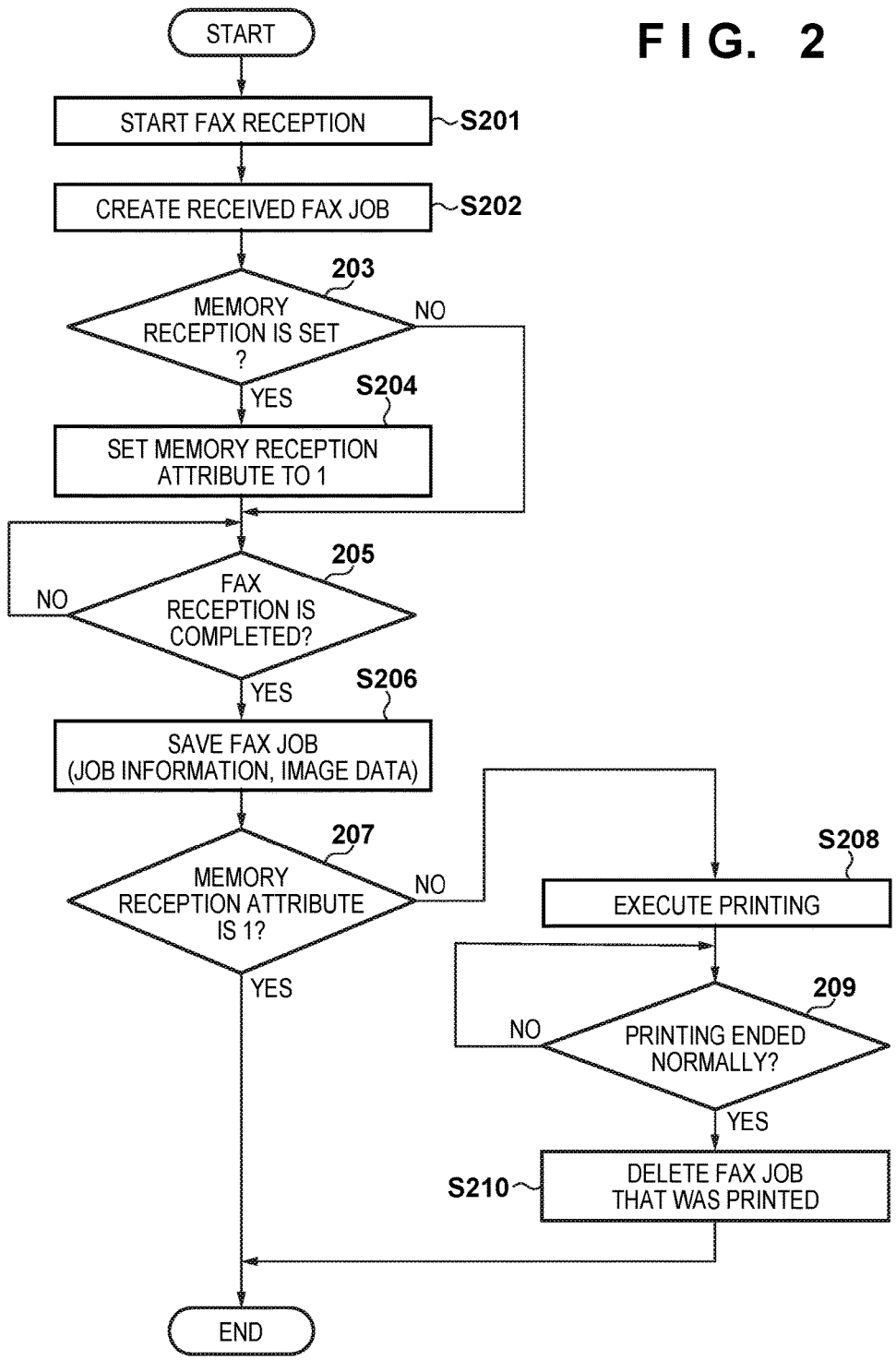
FIG. 2 is a flowchart for describing fax reception processing by the MFP according to the first embodiment.

FIG. 2 is a flowchart for describing fax reception processing by the MFP 100 according to the first embodiment. The processing shown in this flowchart is realized by the CPU 102 deploying the control program stored in the non-volatile storage unit 104 to the RAM 103 and executing the deployed control program.

First, in step S201, the CPU 102 starts fax reception by receiving a facsimile signal. In fax reception, fax data indicating an image and other facsimile signals are received. Next, the processing proceeds to step S202, and the CPU 102 creates a fax reception job following reception of the fax data. Next, the processing proceeds to step S203, and the CPU 102 determines whether the "memory reception function" of saving received fax data in the data area of the non-volatile storage unit 104 without printing has been set. Here, when the CPU 102 determines that the "memory reception function" has been set, the processing proceeds to step S204, and when this is not the case, the processing proceeds to step S205. In step S204, the CPU 102 sets a memory reception attribute of the fax job created in step S202 to "1", and stores the set memory reception attribute in the RAM 103. Other attributes of the fax job apart from "memory reception" include the settings of the MFP 100 and information received from the partner device, such as "resolution", "transfer setting", "sheet size", "received from", "number of pages", and "number of previews". The processing then proceeds to step S205, and the CPU 102 determines whether fax reception has been completed, and when fax reception has been completed, the processing proceeds to step S206.

In step S206, the CPU 102 saves the fax job created in step S202 and the fax data received in step S205 in the data area of the non-volatile storage unit 104. Next, the processing proceeds to step S207, and the CPU 102 determines whether the memory reception attribute of the fax job saved in the RAM 103 in step S206 is "1", and when it is determined to be "1", that is, that the memory reception has been set, the processing ends without printing the fax data. On the other hand, when it is determined that the memory reception attribute is not "1", the processing proceeds to step S208, and the CPU 102 prints the fax data saved in the data area of the non-volatile storage unit 104 using the printer unit 107. In step S209, the CPU 102 then determines whether printing of the fax job ended normally, and when it is determined to have ended normally, the processing proceeds to step S210, and the CPU 102 ends this processing after deleting the fax job and fax data saved in the data area of the non-volatile storage unit 104.

FIG. 3 is a diagram showing exemplary display in which the job statuses of fax jobs received by the MFP 100 are displayed on the PC 121 according to the first embodiment.

On the received job status screen, a list of fax jobs saved in the MFP 100 is displayed, and "Receipt Number", "Time of Receipt", "Received From", "Status", "Job Type", and "Job Operation" are respectively included.

When the receipt number of a job whose memory reception attribute was changed to "1" in step S204 of FIG. 2 is designated on this job status list screen, it is possible to transition to a screen of the RUI (remote user interface) that displays an image of the fax job. A print button 302 is a control button that instructs to print the corresponding fax job. A delete button 303 is a control button that instructs to delete the corresponding fax job. A "To Portal" button 304 is a button for instructing to transition to the home screen of the RUI. A logout button 305 is a button for instructing to log out from the RUI.

Figure 4:
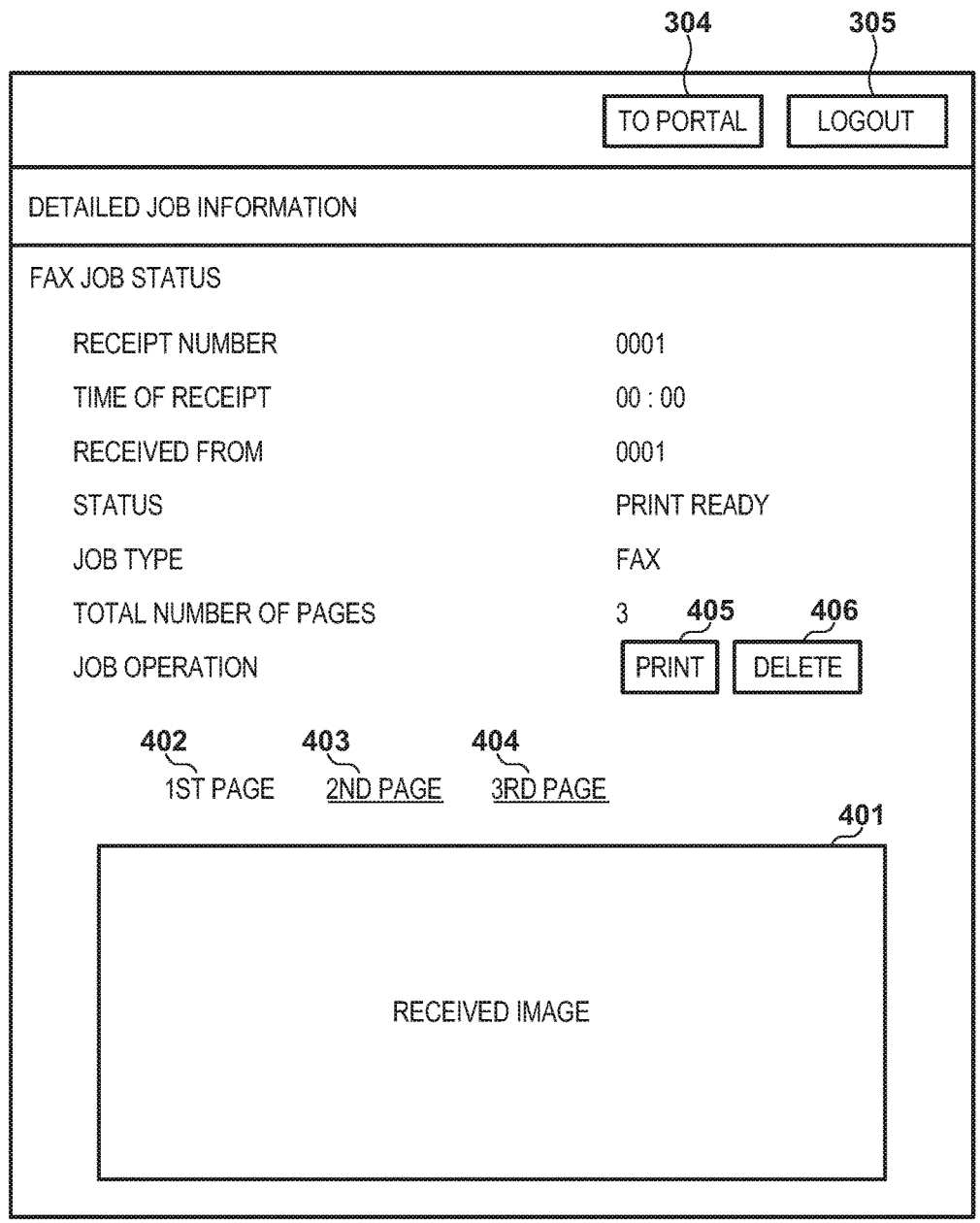
FIG. 4 is a diagram showing an exemplary screen of detailed information on a fax job that is displayed on the PC when a user clicks a receipt number on the RUI of FIG. 3 according to the first embodiment.

FIG. 4 is a diagram showing an exemplary screen of detailed information on the fax job that is displayed on the PC 121 when the user clicks the receipt number 301 on the RUI of FIG. 3 according to the first embodiment. Here, the status of the fax job whose receipt number is "0001" is displayed.

A received image 401 displays an image of a page of the fax job saved in the data area whose receipt number is "0001". Here, since 1st page 402 is selected, an image of the first page is displayed as a preview. In this first embodiment, any of the 1st to 3rd pages can be selected and displayed with reference numerals 402 to 404. Note that, in FIG. 4, the total number of pages of the fax job whose receipt number is "0001" is "3", and thus the pages are designated with the reference numerals 402 to 404, but the number of items designating the number of pages may be changed, according to the total number of received pages. A print button 405 is a control button that instructs to print the fax job that is displayed. A delete button 406 is a control button that instructs to delete the fax job that is displayed.

Figure 5:
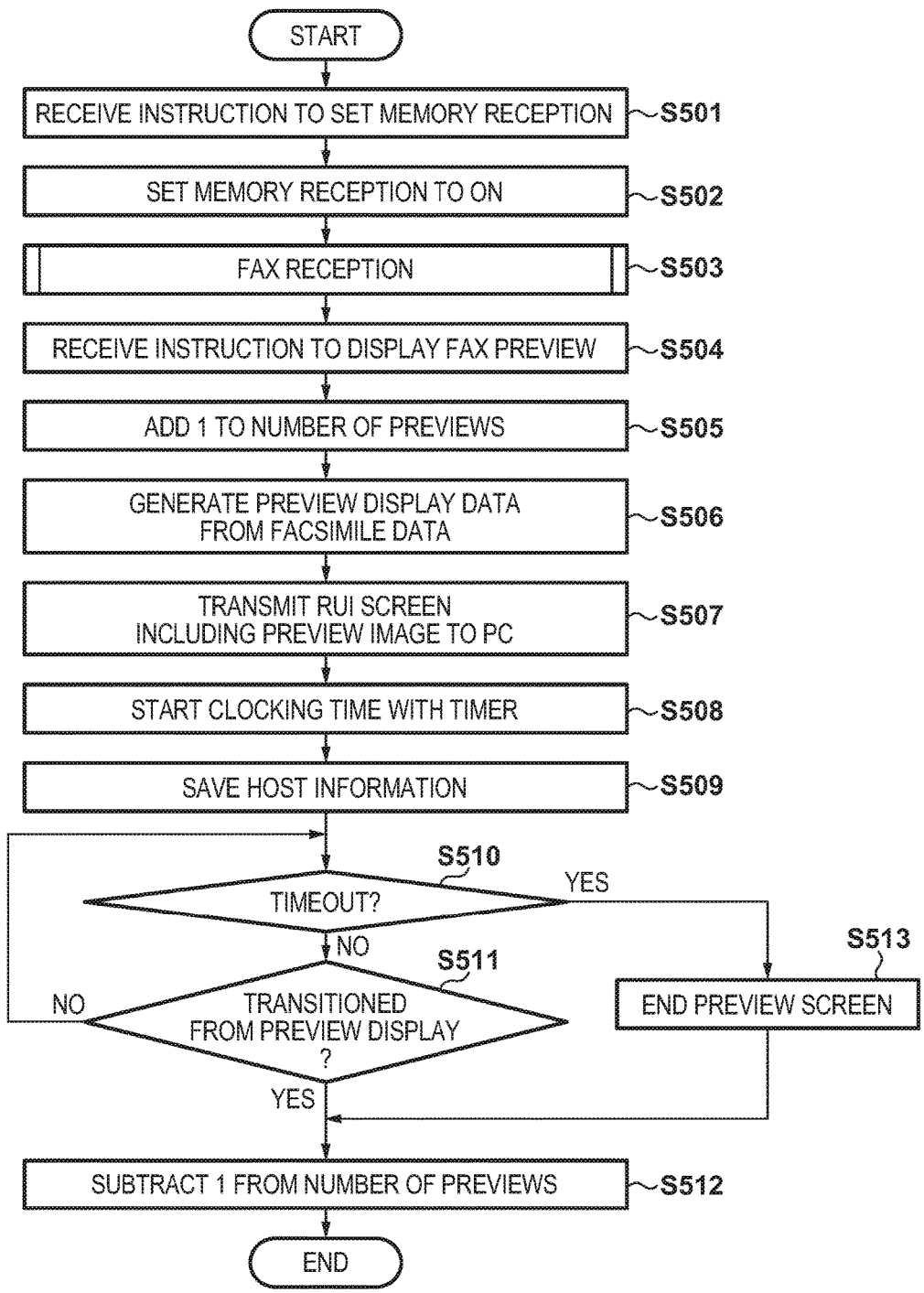
FIG. 5 is a flowchart for describing processing by the MFP for receiving a facsimile and displaying a preview image on the PC according to the first embodiment.

FIG. 5 is a flowchart for describing processing by the MFP 100 for receiving a facsimile and displaying a preview image on the PC 121 according to the first embodiment. The processing shown in this flowchart is realized by the CPU 102 deploying the control program stored in the non-volatile storage unit 104 to the RAM 103 and executing the deployed control program.

First, in step S501, the CPU 102 receives an instruction to set memory reception. This instruction is given by the user via the operation panel 110, for example. The processing then proceeds to step S502, and the CPU 102 sets memory reception to ON and stores the setting in the RAM 103. Fax data subsequently received is thereby saved to the data area of the non-volatile storage unit 104 without being printed. The processing then proceeds to step S503, and fax reception is performed in accordance with the flowchart of FIG. 2 when a facsimile signal is received. When fax reception thus ends, the status of the received job is transmitted to the PC 121. On the PC 121, a status screen of received jobs such as shown in FIG. 3, for example, is thereby displayed.

The processing proceeds to step S504, and the CPU 102 receives a fax preview instruction from the PC 121 via the network 120. As described with reference to FIG. 3, when the receipt number 301 is clicked on the received job status screen displayed on the PC 121, a preview display instruction is received by receiving an URL for transmitting a preview screen. Next, the processing proceeds to step S505, and the CPU 102 adds "1" in association with the selected job, in order to count the number of times previewing of the job was executed. This count value indicating the number of previews is stored in the RAM 103, and the initial value thereof is "0". Next, the processing proceeds to step S506, and the CPU 102 generates display data for a preview based on the image data of the fax job corresponding to the receipt number 301 with respect to which the preview display instruction was received. At this time, the image format (e.g., MH, MR, MMR, etc.) with which faxing is normally performed cannot be displayed on a typical web browser, and thus display data (e.g., JPEG, etc.) that can be displayed on a web browser is generated here. The processing then proceeds to step S507, and the CPU 102 transmits the created display data and a screen of the RUI such as shown in FIG. 4, for example, to the PC 121, via the network 120. In the PC 121, a screen on which fax data is displayed in the received image 401 is thereby displayed on the screen of FIG. 4.

Next, the processing proceeds to step S508, and the CPU 102 starts clocking time with a timer (not shown) that clocks the time of preview display. Next, the processing proceeds to step S509, and the CPU 102 saves information (e.g., IP address, etc.) on the PC 121 (host) that is performing preview display of the received fax data in the RAM 103 in association with the job name and the like of the job that is being previewed. The processing then proceeds to step S510, and the CPU 102 determines whether the clocking of time with the timer has ended and a timeout has occurred, and when a timeout has not occurred, the processing proceeds to step S511, and the CPU 102 determines whether the preview display screen has been changed to another screen. Determining whether the preview display screen has been changed to another screen involves determining whether a button with which screen transition arises such as the "To Portal" button 304 or the "Logout" button 305 of FIG. 4 has been pressed. When the preview display screen has transitioned to another screen, the processing proceeds to step S512, and when this is not the case, the processing proceeds to step S510. In step S512, the CPU 102 ends this processing after subtracting "1", which was added in step S505, from the number of previews of the selected job. Also, the processing proceeds to step S513 when a timeout occurs in step S510, and the CPU 102 closes the preview display screen and proceeds to step S512, where "1" is subtracted from the number of previews of the selected job, and this processing is ended.

The MFP 100 is thereby able to discriminate a received job that is displayed on hosts such as PCs and the number of hosts that are displaying the job. That is, if the number of previews of the selected job is "0", it can be discriminated that the job is not being displayed on any host computers, and if the number of previews is not "0", there exists a host that is displaying a preview of the job.

Figure 6:
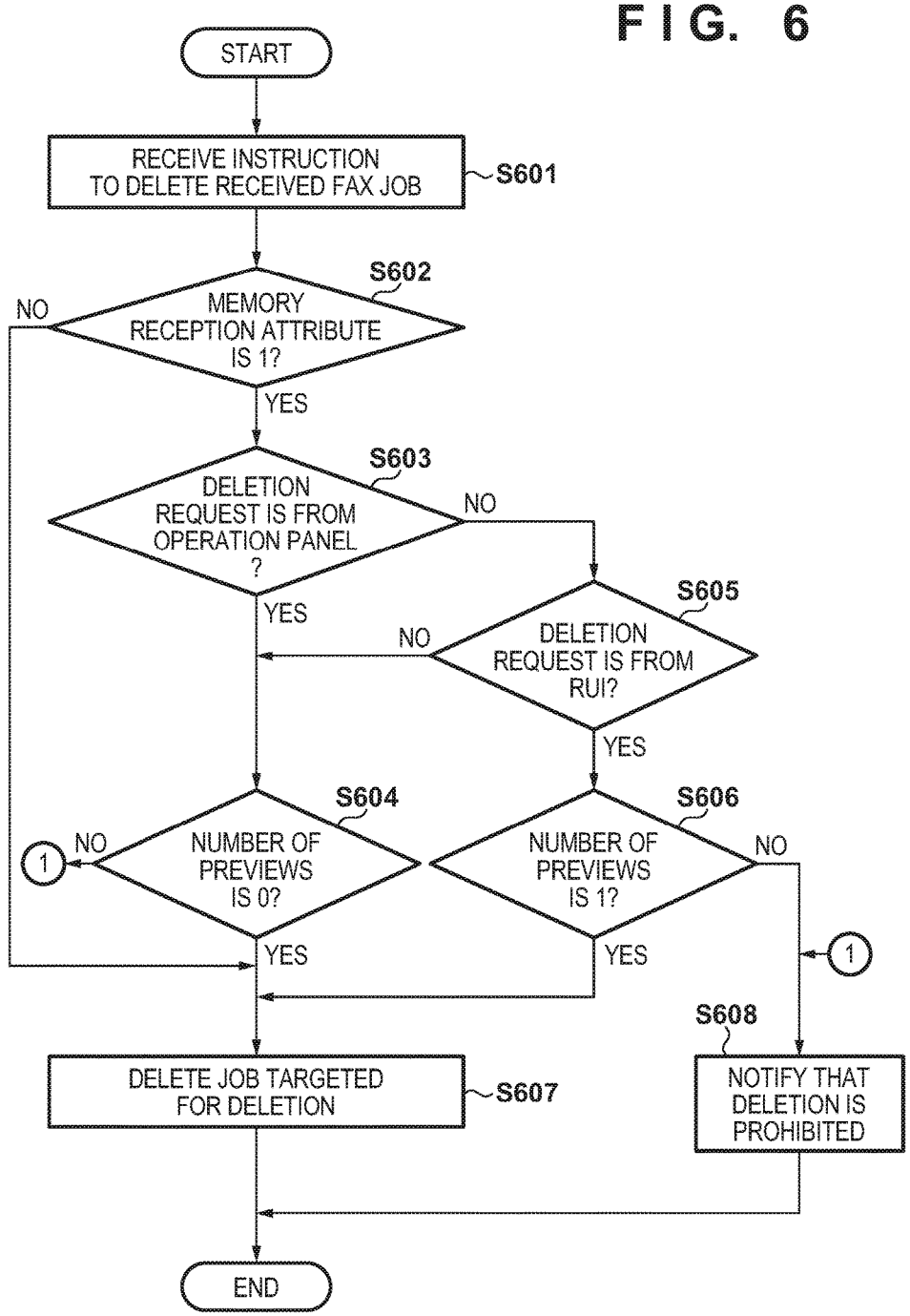
FIG. 6 is a flowchart for describing processing by the MFP for deleting a facsimile job according to the first embodiment.

FIG. 6 is a flowchart for describing processing by the MFP 100 for deleting a facsimile job according to the first embodiment. The processing shown in this flowchart is realized by the CPU 102 deploying the control program stored in the non-volatile storage unit 104 to the RAM 103 and executing the deployed control program. This processing is executed by the delete button 303 or 406 being pressed on the screen of FIG. 3 or FIG. 4, for example, and the pressing of the delete button being notified to the MFP 100 from the PC 121, or by deletion of a received fax job being instructed from the operation panel 110 of the MFP 100.

First, in step S601, the CPU 102 receives an instruction to delete a received fax job. This deletion instruction includes the receipt number of the job targeted for deletion. In step S602, the CPU 102 determines whether the memory reception attribute of the job targeted for deletion is "1", that is, whether the job is a memory reception job. Here, when it is determined to be "1", the processing proceeds to step S603, since the job is saved as a received job, but when this is not the case, the processing proceeds to step S607. In step S603, the CPU 102 determines whether the deletion request was input from the operation panel 110 of the MFP 100. If it is determined to have been input from the operation panel 110, the processing proceeds to step S604, and when it is determined that this is not the case (deletion request from the PC 121), the processing proceeds to step S605. In step S604, the CPU 102 determines whether the number of previews of the job targeted for deletion is "0". Here, when it is determined to be "0", the processing proceeds to step S607, since the job is not being displayed on another PC or the like, and this processing is ended after deleting the job. On the other hand, when it is determined to not be "0", the processing proceeds to step S608, since the job is being displayed on another PC or the like, and this processing is ended after notifying that the job cannot be deleted.

In step S605, the CPU 102 determines whether the deletion request is from the preview screen of the RUI. When it is determined to not be from the preview screen, the processing proceeds to step 5604, and when it is determined to be from the preview screen, the processing proceeds to step S606. Note that the determination of this step S605 involves comparing information on the host that transmitted the preview instruction saved in step S509 of FIG. 5 with information on the host that transmitted the current deletion request, and determining that the deletion request is from the preview screen of the RUI being displayed by that host, if the information matches.

In step S606, the CPU 102 determines whether the number of previews of the job targeted for deletion is "1", and if it is determined to be "1", the processing proceeds to step S607, since the deletion instruction is from the host that is displaying the preview screen of the RUI. In step S607, the CPU 102 sets the number of previews of the job targeted for deletion to "0", and ends this processing after deleting the job.

Figure 9:
FIG. 9 is a diagram showing an exemplary screen that is displayed on an operation panel of the MFP when a job cannot be deleted according to the embodiment.

On the other hand, when the CPU 102 determines in step S606 that the number of previews of the job targeted for deletion is not "1", the processing proceeds to step S608, and the CPU 102 subtracts "1" from the number of previews of the job, and ends this processing after further notifying that the job cannot be deleted. At this time, when the deletion request is input from the operation panel 110, a deletion prohibited screen such as shown in FIG. 9, for example, is displayed on the operation panel 110. On the other hand, if the deletion request is received from the PC 121 via the network 120, a deletion prohibited screen such as shown in FIG. 9, for example, is transmitted to the PC 121, for example.

It is thereby possible to prevent a job targeted for deletion from being deleted, when the job targeted for deletion is being previewed on another PC or the like. The occurrence of a situation in which a job being previewed by one user is deleted by another user and the user previewing the job becomes unable to print the job when he or she tries to print can thereby be avoided.

Figure 7:
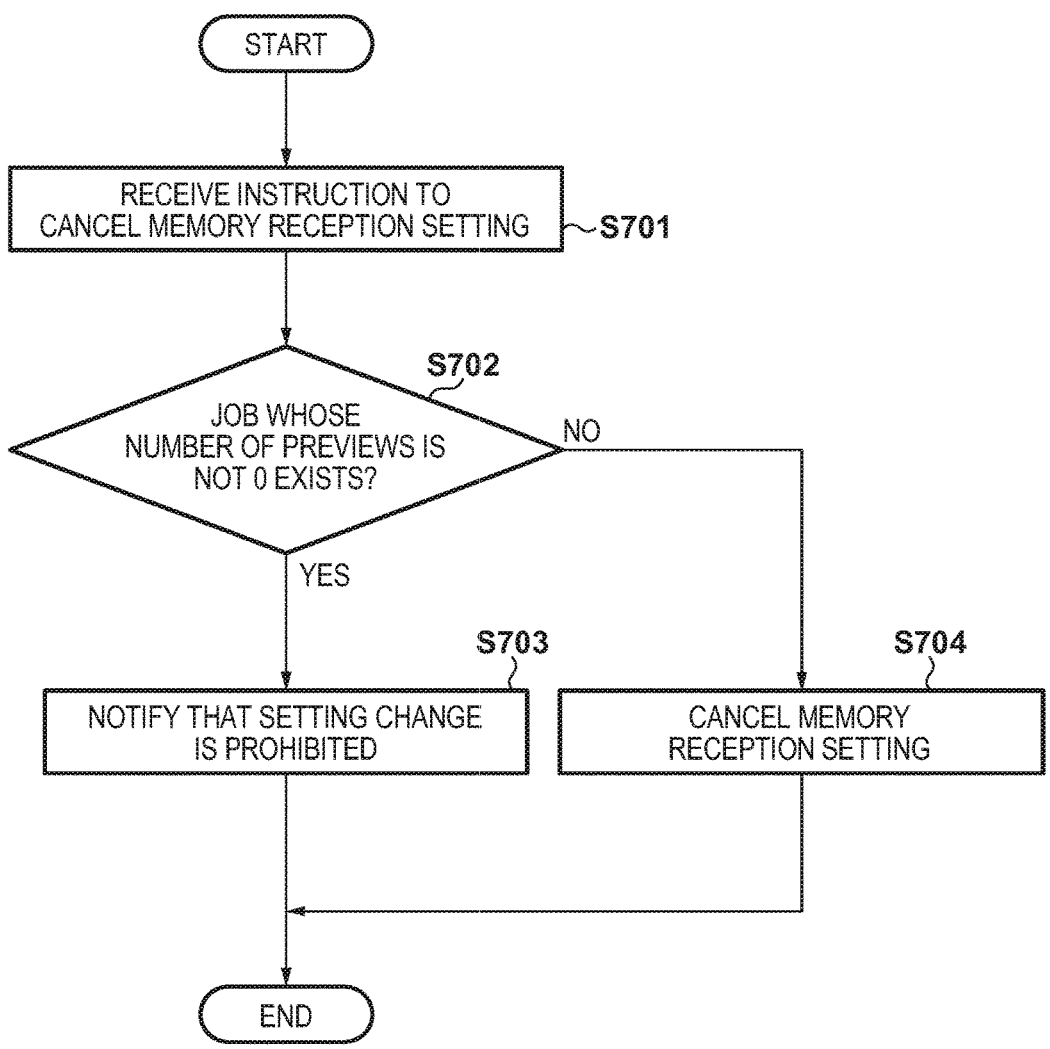
FIG. 7 is a flowchart for describing processing by the MFP when canceling a memory reception setting according to the first embodiment.

FIG. 7 is a flowchart for describing processing by the MFP 100 when canceling the memory reception setting according to the first embodiment. The processing shown in this flowchart is realized by the CPU 102 deploying the control program stored in the non-volatile storage unit 104 to the RAM 103 and executing the deployed control program.

First, in step S701, the CPU 102 receives an instruction to cancel the memory reception setting. This cancelation instruction is given by being instructed by the user via the operation panel 110 or by being instructed from the PC 121. Next, the processing proceeds to step S702, and the CPU 102 determines whether a job whose number of previews is not "0" is stored in the nonvolatile storage unit 104. Here, when it is determined that there is a job whose number of previews is not "0", the processing proceeds to step S703, and when this is not the case, the processing proceeds to step S704. In step S703, the CPU 102 ends this processing after notifying that the memory reception setting cannot be canceled.

Figure 10:
FIG. 10 is a diagram showing an exemplary screen that is displayed on the operation panel of the MFP when the memory reception setting cannot be changed according to the embodiment.

Here, if the instruction to cancel the memory reception setting is input from the operation panel 110, a screen indicating that the memory reception setting cannot be changed, such as shown in FIG. 10, for example, is displayed on the operation panel 110. Also, if the instruction to cancel the memory reception setting is received from the PC 121 via the network 120, this screen is transmitted to the PC 121.

On the other hand, in step S704, the CPU 102 ends this processing after canceling the memory reception setting.

It is thereby possible to prevent the memory reception setting of the MFP 100 from being canceled, when there is a job being previewed on another PC or the like. The occurrence of a situation in which the memory reception setting is canceled while a user is previewing a job and the user becomes unable to print the job when he or she tries to print can thereby be avoided.

In the first embodiment, it was determined whether preview display has ended by determining whether there has been a screen transition or whether a timeout has occurred, although any other method that enables it to be determined whether a job is being previewed may be used. For example, information may be transmitted to the MFP 100 from the PC at a fixed time interval while the PC is performing preview display on the RUI, and it can be determined that preview display on the PC has ended when the information is no longer received.

Also, in the first embodiment, it was determined whether preview display is being performed upon accepting job deletion or a memory reception setting change. However, a configuration may be adopted such that, in the case where a given job is being previewed, changing of the memory reception setting or deletion of the job being previewed is not accepted. In that case, the delete button and the button for changing the memory reception setting (not shown) may be grayed out.

Second Embodiment

In the aforementioned first embodiment, an example was described in which, when deletion of a job during fax preview display is instructed on the MFP 100, it is notified that the job cannot be deleted. In contrast, in the second embodiment, an example is described in which, when deletion of a job from a job list such as shown in FIG. 3, for example, is instructed from a user of a PC, the job is deleted from the job list, after which the user of the PC is unable to preview the job. On the other hand, other users of other PCs who were previewing the job prior to the job deletion instruction are able to perform operations on the job.

Figure 8:
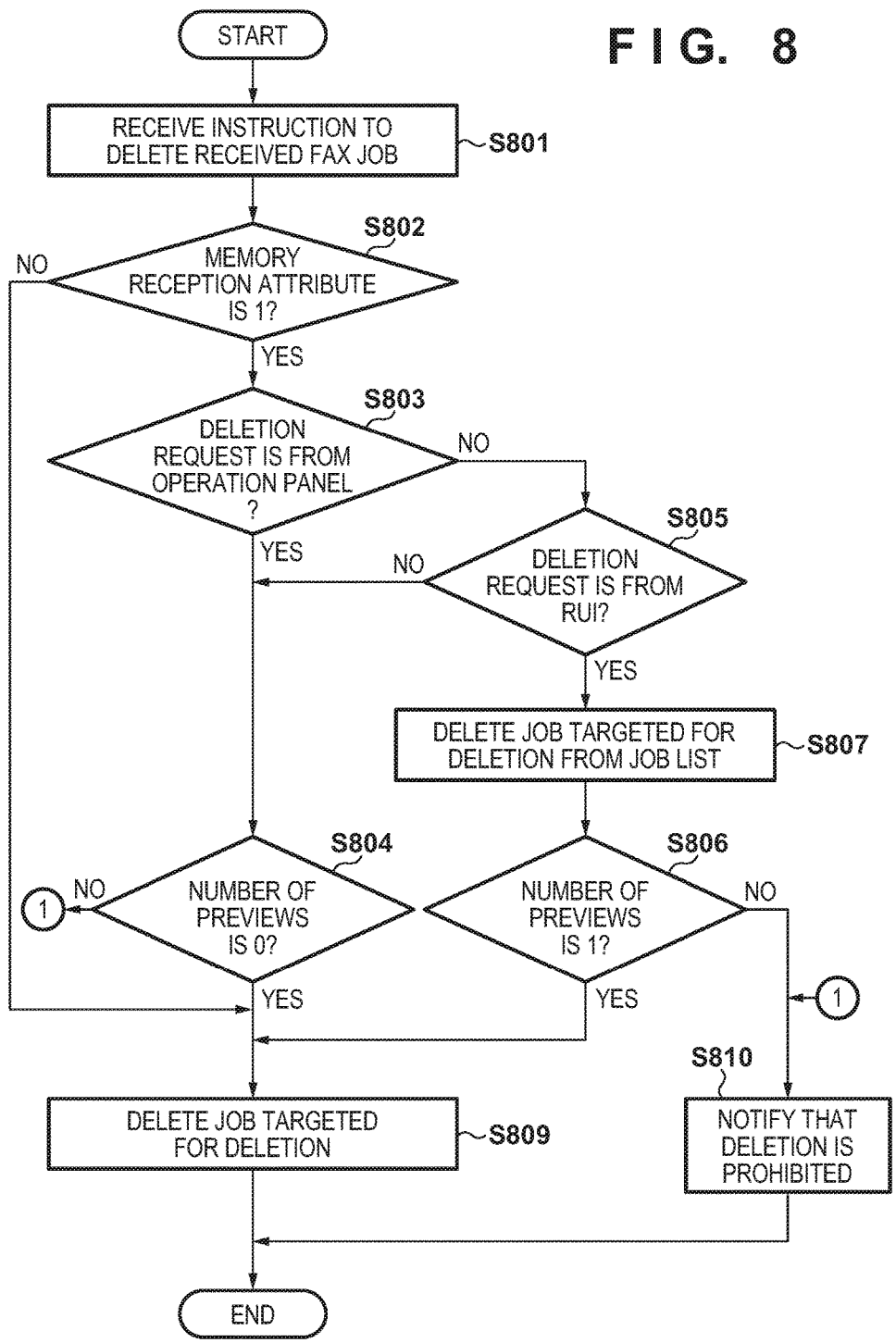
FIG. 8 is a flowchart for describing processing by the MFP for deleting a facsimile job according to a second embodiment.

FIG. 8 is a flowchart for describing processing by the MFP 100 for deleting a facsimile job according to the second embodiment of the present invention. The processing shown in this flowchart is realized by the CPU 102 deploying the control program stored in the non-volatile storage unit 104 to the RAM 103 and executing the deployed control program. Note that since the processing of steps S801 to S806 and step S809 in FIG. 8 are similar to steps S601 to S607 of FIG. 6 in the aforementioned first embodiment, description thereof will be omitted.

In step S807, the CPU 102 deletes the job instructed to be deleted from the list of jobs in FIG. 3, for example. At this time, the data of the job that is stored in the data area of the non-volatile storage unit 104 is not deleted. Next, the processing proceeds to step S806, and the CPU 102 determines whether the number of previews of the job targeted for deletion is "1", that is, whether the job is only being previewed on the PC 121 and is not being previewed on another PC or the like. Here, when the number of previews is determined to be "1", the processing proceeds to step S809 and the data of the job targeted for deletion is deleted from the data area of the non-volatile storage unit 104. At this time, the number of previews of the job is also initialized to "0".

On the other hand, when the number of previews of the job targeted for deletion is not "1" in step S806, that is, when the job is being previewed on another PC or the like besides preview display on the PC 121, the processing proceeds to step S810. In step S810, the CPU 102 ends this processing after notifying that the job cannot be deleted, similarly to the aforementioned step S608 of FIG. 6.

In the case where deletion of a job from a job list is instructed on a given PC or the like, the job is thereby deleted from the job list of the PC. However, when other users are referring to the preview display of the job, the data of the job is not deleted from the non-volatile storage unit 104. The user of another PC that is displaying a preview of the job is thereby able to execute printing or the like of the job that is being previewed, without being adversely affected by the deletion of the job from the job list.

Note that a configuration may be adopted such that, at this time, the data of the job is deleted after the user of the other PC has finished previewing the job.

Also, in the first and second embodiments, a configuration may be adopted such that a job being previewed can only be deleted in the case where an administrator is logged in to the PC 121.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-022217, filed Feb. 8, 2016, which is hereby incorporated by reference herein in its entirety.

What is claimed is:

1. A communication apparatus being capable of performing facsimile communication, comprising:
   at least one memory that stores a set of instructions; and
   at least one processor that executes the instructions to:
   receive facsimile data;
   store the received facsimile data in a storage;
   generate a preview image, based on the facsimile data stored in the storage;
   transmit, according to a request for a preview image from an external device, the generated preview image to the external device;
   determine whether or not the external device is displaying the preview image of the facsimile data; and
   delete, in a case where an instruction to delete the facsimile data stored in the storage is received from another external device and it is determined that the external device is not displaying the preview image of the facsimile data, the facsimile data in the storage according to the instruction,
   wherein, in a case where the instruction to delete is received from the another external device and it is determined that the external device is displaying the preview image of the facsimile data, the facsimile data, in the storage is not deleted according to the instruction.

2. The communication apparatus according to claim 1, wherein, in a case where an instruction to delete is input from an operation panel of the communication apparatus and the external device is displaying the preview image of the facsimile data, the facsimile data in the storage is not deleted according to the instruction.

3. The communication apparatus according to claim 1,
   wherein the at least one processor further executes the instructions to:
   clock time in response to a reception of the request for the preview image from the external device; and
   enable to delete the facsimile data in the storage according to the instruction to delete facsimile data stored in the storage from another external device in accordance with having a clocked time reach a predetermined time period.

4. The communication apparatus according to claim 1,
   wherein the at least one processor further executes the instructions to:
   notify an error according to the instruction to delete the facsimile data in the storage from the another external device while the external device is displaying the preview image of the facsimile data.

5. The communication apparatus according to claim 1,
   wherein the at least one processor further executes the instructions to:
   store the received facsimile data in the storage, in a case where a memory reception mode for storing the received facsimile data in the storage without printing the received facsimile data is set; and
   restrict to reset the memory reception mode during the external device displaying the preview image of the facsimile data.

6. The communication apparatus according to claim 1, wherein the at least one processor further executes the instructions to:

delete the facsimile data in the storage in a case that the instruction to delete the facsimile data in the storage is received from the external device even if the external device is displaying the preview image of the facsimile data.

7. The communication apparatus according to claim 1, wherein the at least one processor determines whether or not the external device is displaying the preview image of the facsimile data in accordance with whether or not having received a transition request to another screen from the external device.

8. The communication apparatus according to claim 7, wherein the at least one processor determines that the external device is not displaying the preview image in a case that a predetermined time period has elapsed without receiving the transition request after the request for the preview image is received from the external device.

9. The communication apparatus according to claim 1, wherein the at least one processor further executes the instructions to:
   generate the preview image in a form of which a Web browser is able to displayed based on the facsimile data stored in the storage; and
   transmit a screen image, including the generated preview image, that is able to be displayed by the Web browser to the external device.

10. A method of controlling a communication apparatus being capable of performing facsimile communication, the method comprising:
   receiving facsimile data;
   storing the received facsimile data in a storage;
   generating a preview image, based on the facsimile data stored in the storage;
   transmitting, according to a request for a preview image from an external device, the generated preview image to the external device;
   determining whether or not the external device is displaying the preview image of the facsimile data; and
   deleting, in a case where an instruction to delete the facsimile data stored in the storage is received from another external device and it is determined that the external device is not displaying the preview image of the facsimile data, the facsimile data in the storage according to the instruction,
   wherein, in a case the instruction to delete is received from the another external device and it is determined that the external device is displaying the preview image of the facsimile data, the facsimile data in the storage is not deleted according to the instruction.

11. A non-transitory computer-readable storage medium storing a program for causing a processor to execute a method of controlling a communication apparatus being capable of performing facsimile communication, the method comprising:
   receiving facsimile data;
   storing the received facsimile data in a storage;
   generating a preview image, based on the facsimile data stored in the storage;
   transmitting, according to a request for a preview image from an external device, the generated preview image to the external device;
   determining whether or not the external device is displaying the preview image of the facsimile data; and
   deleting, in a case where an instruction to delete the facsimile data stored in the storage is received from another external device and it is determined that the external device is not displaying the preview image of the facsimile data, the facsimile data in the storage according to the instruction,
   wherein, in a case where the instruction to delete is received from the another external device and it is determined that the external device is displaying the preview image of the facsimile data, the facsimile data in the storage is not deleted according to the instruction.

\* \* \* \* \*